United States Patent Office 3,331,821
Patented July 18, 1967

3,331,821
CATALYST COMPOSITION AND PROCESS OF PREPARING CONJUGATED DIENE POLYMERS UTILIZING SAME
Charles W. Strobel, Borger, Tex., assignor to Phillips Petroleum Company, a corporation of Delaware
No Drawing. Filed Nov. 14, 1963, Ser. No. 323,573
14 Claims. (Cl. 260—83.7)

This invention relates to the preparation of conjugated diene polymers, including homopolymers and copolymers of conjugated dienes as well as copolymers of conjugated dienes with other unsaturated compounds. In one aspect, it relates to a process for preparing novel random copolymers of certain conjugated dienes and vinyl-substituted aromatic hydrocarbons. In another aspect, it relates to a novel catalyst system for use in preparing conjugated diene polymers.

It is known that organosodium compounds can be utilized as catalysts for the polymerization of conjugated dienes such as 1,3-butadiene. However, the utilization of these compounds as catalysts to polymerize conjugated dienes has not been entirely satisfactory because the conversion rates are generally low. As a result, polymerization process utilizing organosodium compounds have not been used extensively on a commercial scale even though the catalytic effect of the compounds has been known for many years. The present invention provides a catalyst system based on organosodium compounds which is effective in polymerizing conjugated dienes at high conversion rates.

It is an object of this invention to provide a novel catalyst system for use in preparing conjugated diene polymers.

Another object of the invention is to provide a process for preparing conjugated diene polymers, including homopolymers and copolymers of conjugated diene as well as copolymers of conjugated diene with other unsaturated compounds.

A further object of the invention is to provide a process for preparing completely random copolymers of certain conjugated dienes and vinyl-substituted aromatic hydrocarbons.

Other and further objects and advantages of the invention will become apparent to those skilled in the art upon consideration of the following disclosure.

The present invention resides in the discovery of a novel catalyst system for use in a process for the preparation of conjugated diene polymers. The catalyst can be employed in the polymerization of conjugated dienes alone or in admixture with vinyl-substituted aromatic hydrocarbons. Broadly speaking, the polymerization process of this invention comprises the step of contacting in a polymerization zone a conjugated diene, either alone or in admixture with another conjugated diene or a vinyl-substituted aromatic hydrocarbon, with a catalyst which forms on mixing components comprising (1) an organosodium compound and (2) an organic compound of lithium. When proceeding in accordance with this process, the monomers are polymerized at high conversion rates. This was completely unexpected since organosodium compounds when used alone as catalysts give low conversion rates and the organic compounds of lithium when used alone do not function as polymerization catalysts.

Organosodium compounds employed in preparing the catalyst of this invention correspond to the formula R(Na)$_x$ wherein R is a hydrocarbon radical selected from the group consisting of aliphatic, cycloaliphatic and aromatic radicals, and x is an integer from 1 to 4, inclusive. The R in the formula preferably contains from 1 to 20 carbon atoms, although it is within the scope of the invention to use higher molecular weight compounds. Examples of organo-sodium compounds which can be used include methylsodium, isopropylsodium, n-butylsodium, sec-butylsodium, tert-octylsodium, n-decylsodium, phenylsodium, naphthylsodium, 4-butylphenylsodium, p-tolysodium, 4-phenylbutylsodium, cyclohexylsodium, 4-butylcyclohexylsodium, 4-cyclohexylbutylsodium, disodiomethane, 1,4-disodiobutane, 1,10-disodiodecane, 1,20 - disodioeicosane, 1,4-disodiocyclohexane, 1,4-disodio-2-butene, 1,8-disodio-3-decene, 1,4-disodiobenzene, 1,2-disodio - 1,2-diphenylethane, 1,2-disodio-1,8-diphenyloctane, 1,3,5 - trisodiopentane, 1,5,15 - trisodioeicosane, 1,3,5-trisodiocyclohexane, 1,3,5,8-tetrasodiodecane 1,5, 10,20 - tetrasodioeicosane, 1,2,4,6-tetrasodiocyclohexane, 4,4'-disodiobiphenyl, and the like.

As mentioned above, the other component employed in preparing the present catalyst is an organic compound of lithium. These compounds are selected from the group consisting of compounds having the following formulas:

(1) $R'(YLi)_n$ (2) 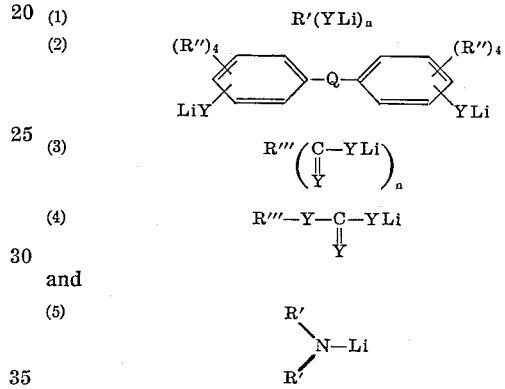

(3) $R'''\left(\underset{Y}{\overset{C-YLi}{\|}}\right)_n$ (4) $R'''-Y-\underset{Y}{\overset{\|}{C}}-YLi$ and (5) 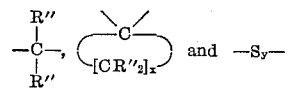

wherein R' is selected from the group consisting of aliphatic, cycloaliphatic and aromatic radicals, preferably containing from 1 to 20 carbon atoms, R" is selected from the group consisting of hydrogen and aliphatic, cycloaliphatic and aromatic radicals, preferably containing from 1 to 6 carbon atoms, Q is selected from the group consisting of $$-\underset{R''}{\overset{R''}{\underset{|}{C}}}-, \quad \underset{[CR''_2]_x}{\overset{C}{\diagup\diagdown}}, \quad \text{and} \quad -S_y-$$

radicals, where R" is as defined above, x is an integer from 4 to 5, inclusive, and y is an integer from 1 to 3, inclusive, R''' is selected from the group consisting of aliphatic, cycloaliphatic and aromatic radicals, preferably containing from 4 to 20 carbon atoms, Y is selected from the group consisting of oxygen and sulfur and n is an integer from 1 to 3, inclusive. It is to be understood that the aliphatic and cycloaliphatic radicals mentioned above can be saturated or unsaturated.

Formulas 1 and 2 define the lithium salts of mono- and polyhydric alicohols, mono- and polyhydric phenols, including bis-phenols and sulfur analogs of the foregoing, that can be used in preparing the present catalyst system. Specific examples of compounds represented by Formula 1 include the lithium salts of methyl alcohol, ethyl alcohol, n-propyl alcohol, isopropyl alcohol, tert-butyl alcohol, tert-amyl alcohol, n-hexyl alcohol, cyclohexyl alcohol, eicosyl alcohol, 2-butenyl alcohol, 4-methylcyclohexyl alcohol, 3-hexenyl alcohol, 2,5-decadienyl alcohol, 3-cyclopentyl alcohol, 4,6-di-n-butyldecyl alcohol, 4,8-dodecadienyl alcohol, allyl alcohol, 1,3-dihydroxyhexane, 1,5,9-trihydroxytridecane, 1,6-dihydroxy-octane, 1,9,15-trihydroxypentadecane, benzyl alcohol, 3(4-tolyl) propyl alcohol, phenol, catechol, resorcinol, hydroquinone, pyrogallol, 1-naphthol, 2-naphthol, 2,6-di-tertbutyl-4-methylphenol (Ionol), 2,4,6-tri-tert-butylphenol, 2,6-di-tert-butyl-4-phenylphenol, 2,6-di-sec-butyl-4-methylphenol, ethanethiol, 1-butanethiol, 2-pentanethiol, 2-isobutanethiol, benzenethiol (thiophenol), 1,12-dodecanedithiol, 5,9-di-n-propyl-1,14-tetradecanedithiol, 2-naphthalenethiol, cyclohexanethiol, 2,5-di-n-phenyl-6-tert-butylbenzenethiol, 2,6-di-tert-butyl-4(4-tolyl)benzenethiol, 3-methylcyclohexanethiol, 2-naphthalenethiol, benzenemethanethiol, 2-naphthalenemethanethiol, 1,8-octanedithiol, 1,10-decanedithiol, 1,4-benzenedithiol, and the like. Specific examples of suitable compounds corresponding to Formula 2 are the lithium salts of 2,2'-methylene-bis(4-methyl - 6-tert-butylphenol), 2,2'-isopropylidene-bis(6-cyclohexyl-p-cresol), 4,4'-isopropylidene-bis(2,6-dicyclohexylphenol), 4,4'-methylene-bis(2,6-diisopropylphenol), 2,2'-methylene-bis(6-benzyl-p-cresol), 2,2'-ethylidene-bis(5-isopropylphenol), 1,1-bis(4-hydroxyphenyl)cyclohexane, 1,1-bis[2-hydroxy-3-(3-tolyl)]cyclopentane, 2,2'-ethylidene-bis(4-ethyl-6-tert-hexylthiophenol), 2,2'-propylidene - bis(3,5-dimethyl - 6-cyclopentylthiophenol), 4,4'-thio-bis(2,6-di-tert-butylphenol), 4,4'-dithio-bis(2-n-propyl - 6-tert-butylphenol), 4,4'-trithio-bis-(2-methyl-6-isopropylphenol), and the like.

Specific examples of the lithium salts of mono- and polycarboxy acids and sulfur analogs as represented by Formula 3 include the lithium salts of isovaleric acid, caprylic acid, lauric acid, myristic acid, palmitic acid, stearic acid, arachidic acid, oleic acid, ricinoleic acid, linoleic acid, linolenic acid, gadoleic acid, cyclopentanecarboxylic acid, dimethylcyclohexane - 3,5 - dicarboxylic acid, phenylacetic acid, benzoic acid, pimelic acid, azelaic acid, sebacic acid, phthalic acid, hendecane-1,11-dioic acid, 1,8,16-hexadecanetricarboxylic acid, 3,3,7,7-tetramethylnonane-1,5,9-tricarboxylic acid, 4 pentyl-2,5-heptadiene-1,7-dioic acid, 2-naphthoic acid, 1-naphthaleneacrylic acid, hexanethionic acid, 2,2-diethylbutanethiolic acid, decanethionic acid, tridecanethionothiolic acid, 4-tetradecenthionic acid, thiolbenzoic acid, thiono-1-naphthoic acid, and the like.

Specific examples of lithium carbonates and sulfur analogs as represented by Formula 4 include the lithium salts of tert-butylcarbonic acid,
n-hexylcarbonic acid,
3,5-dimethylhexylcarbonic acid,
n-dodecylcarbonic acid,
4,4-diethylhexylcarbonic acid,
3,6-diphenyloctylcarbonic acid,
7-dodecenylcarbonic acid,
3-cyclohexenylcarbonic acid,
phenylcarbonic acid,
O-tert-amyl ester of thiolcarbonic acid,
O-tridecyl ester of thionocarbonic acid,
O-eicosyl ester of thionothiocarbonic acid (xanthic acid),
S-hexadecyl ester of dithiolcarbonic acid,
S-(3-cyclohexenyl) ester of thiolcarbonic acid,
phenyl ester of trithiocarbonic acid, and the like.

Specific examples of lithium salts of secondary amines as represented by Formula 5 include the lithium salts of dimethylamine, di-n-butylamine, methyl-n-hexylamine, di-(3,5-diethyloctyl)amine, di(8-phenyloctyl)amine, di(3-hexenyl)amine, diphenylamine, dibenzylamine, ethyl-4-tolylamine, n-propyl-n-eicosylamine, and the like.

It is to be understood that any one or more of the organic compounds of lithium as represented by the formulas can be used with one or more of the R(Na)$_x$ compounds in forming the present catalyst system. Lithium derivatives of compounds having mixed functionality can also be employed with the R(Na)$_x$ compounds. Examples of such derivatives include the lithium salts of 10-hydroxydecanoic acid, 8-mercapto-1-naphthoic acid, 1-hydroxy-14-mercapto-8-tetradecene, 1-hydroxy-9-mercapto-pentadecanoic acid, 2-tert-butyl-6-mercapto-1-naphthoic acid, and the like.

The amount of the organosodium compound employed in forming the catalyst system can vary over a wide range. It will generally be in the range of 0.25 to 100 milliequivalents of organosodium compound per 100 parts by weight of total monomers charged with from 0.6 to 15 milliequivalents of organosodium compound per 100 parts of total monomers being preferred. The relative quantities of organosodium compounds and the organic compounds of lithium can also vary over a rather broad range. The amount of the organosodium compound will generally be in the range of 0.01 to 20 equivalents (based on sodium atoms) per equivalent of the organic compound of lithium. The amount of catalyst employed will vary, depending upon the type of polymer prepared. Products ranging from liquids to solid can be prepared with the present catalyst system.

Monomers that are polymerized in accordance with the present process are selected from the group consisting of (1) at least one conjugated diene and (2) a mixture of at least one conjugated diene and at least one vinyl-substituted aromatic hydrocarbon. Conjugated dienes that can be used preferably contain from 4 to 12 carbon atoms per molecule and include 1,3-butadiene,
isoprene,
1,3-pentadiene,
2,3-dimethyl-1,3-butadiene,
2-methyl-1,3-pentadiene,
2,3-dimethyl-1,3-pentadiene,
2-phenyl-1,3-butadiene,
and 4,5-diethyl-1,3-octadiene.

The vinyl-substituted aromatic hydrocarbons that can be employed include any vinyl-substituted aromatic hydrocarbon in which the vinyl group is attached to a nuclear carbon atom. It is to be understood that a compound having a substituent on the alpha carbon atom, such as alpha-methylstyrene, is not applicable to the practice of the instant invention. Examples of vinyl-substituted aromatic hydrocarbons which are often preferred are styrene, 1-vinylnapthalene and 3-methylstyrene (3-vinyltoluene). Examples of other compounds which can be advantageously utilized include 3,5-diethylstyrene,
4-n-propylstyrene,
2,4,6-trimethylstyrene,
4-dodecylstyrene,
3-methyl-5-n-hexylstyrene,
4-cyclohexylstyrene,
4-phenylstyrene,
2-ethyl-4-benzylstyrene,
4-p-tolylstyrene,
3,5-diphenylstyrene,
2,3,4,5-tetraethylstyrene,
3-(4-n-hexylphenyl)styrene,
3-ethyl-1-vinylnaphthalene,
6-isopropyl-1-vinylnaphthalene,
3,6-di-p-tolyl-1-vinylnaphthalene,
6-cyclohexyl-1-vinylnaphthalene,
8-phenyl-1-vinylnaphthalene,
7-dodecyl-2-vinylnaphthalene, and the like.

The process of this invention is particularly concerned with the preparation of rubbery homopolymers and copolymers of conjugated dienes. The process is especially applicable to the production of completely random copolymers, i.e., they do not contain a polymer block of the vinyl-substituted aromatic. The rubbery homopolymer as well as the random copolymer products are usually gel-free and have excellent physical properties, which render them particularly suitable for use in the fabrication of automobile and truck tires. However, by varying the amount of catalyst employed in the polymerization process liquid polymers can also be prepared.

The amount of conjugated diene and vinyl-substituted aromatic hydrocarbon employed in the preparation of the completely random copolymers can vary over a rather wide range, e.g. from 5 to 95 parts by weight of conjugated diene and from 95 to 5 parts by weight of vinyl-substituted aromatic hydrocarbon, both based on 100 parts by weight of total monomers. In preparing rubbery random copolymers, it is usually preferred to employ from 95 to 50 parts by weight of conjugated diene and from 5 to 50 parts by weight of vinyl-substituted aromatic hydrocarbons. It is to be understood that mixtures of conjugated dienes as well as mixtures of the vinyl-substituted aromatic hydrocarbons can be utilized in preparing the random copolymers.

The polymerization process of this invention can be carried out at any temperature within the range of about −80 to 150° C., but it is preferred to operate in the range of −20 to 80° C. The polymerization reaction can be carried out under autogeneous pressures. It is usually desirable to operate at pressure sufficient to maintain the monomeric materials substantially in the liquid phase. The pressure will thus depend upon the particular materials being polymerized, the diluent employed, and the temperature at which the polymerization is carried out. However, higher pressures can be employed, if desired, these pressures being obtained by some such suitable method as the pressurization of the reactor with a gas which is inert wtih respect to the polymerization reaction.

The process of this invention is usually carried out in the presence of a hydrocarbon diluent selected from the group consisting of aromatic, paraffinic and cycloparaffinic hydrocarbons. The preferred hydrocarbons of these types are paraffins and cycloparaffins containing from 3 to 12, inclusive, carbon atoms per molecule. Examples of suitable diluents include propane, isobutane, n-pentane, isooctane, n-dodecane, cyclopentane, cyclo hexane, methylcyclohexane, benzene, toluene, xylene, ethylbenzene, and the like. It is to be understood that mixtures of two or more of these hydrocarbon diluents can also be used. The amount of diluent employed in the process is usually in the range of 200 to 2,000 parts by weight per 100 parts by weight of total monomers with 300 to 1500 parts being a preferred range.

The process of this invention can be carried out as a batch process by utilizing any suitable charging procedure, e.g., by charging the monomeric material into a reactor containing the catalyst and the diluent. In another method, the two catalyst components are charged separately to the reactor, either prior to or subsequent to the addition of the monomeric material and/or the diluent. It is also within the scope of the invention to preform the catalyst by mixing the two catalyst components in a liquid hydrocarbon, preferably the same as the polymerization diluent. It is also frequently advantageous to age the catalyst, particularly when the second component, i.e., the lithium compound is not readily soluble in the liquid hydrocarbon. In such cases, optimum results are obtained by aging the mixture at a temperature in the range of about 25° C. to 150° C. The aging time depends upon the temperature used and the solubility of the second catalyst component, but it is usually in the range of about 5 minutes to about 200 hours. A preferred aging time is in the range of 1 to 100 hours, but times as long as 6 to 8 months can be used. The process can also be practiced in a continuous manner by maintaining the above-described concentrations of reactants in the reactor for a suitable residence time. The residence time in the continuous process will, of course, vary within rather wide limits depending upon such variables as reaction temperature, pressure, the amount of catalyst used and the monomeric materials being polymerized. In a continuous process the residence time generally falls within the range of 1 second to 1 hour when conditions within the specified ranges are employed.

When a batch process is being utilized, the time for the reaction can be as high as 24 hours or more although it is generally less than 24 hours.

Upon completion of the polymerization period, the reaction mixture is treated in order to inactivate the catalyst and recover the polymer. It is generally preferred to add only an amount of a catalyst deactivating material, such as water or an alcohol, which is sufficient to deactivate the catalyst without causing precipitation of the dissolved polymer. It has also been found to be advantageous to add an antioxidant, such as phenyl-beta-naphthylamine, to the polymer solution prior to precipitation of the polymer. After addition of the catalyst deactivating agent and the antioxidant, the polymer present in the solution can then be precipitated by the addition of an excess of a material such as ethyl alcohol or isopropyl alcohol. It is to be understood, however, that deactivation of the catalyst and precipitation of the polymer can be accomplished in a single step. The precipitated polymer can then be recovered by filtration, decantation, and the like. In order to purify the polymer, the separated polymer can be redissolved in a suitable solvent and again precipitated by addition of an alcohol. Thereafter, the polymer is again recovered by separation steps, as indicated hereinbefore, and dried. Any suitable hydrocarbon solvent, such as mentioned hereinbefore, can be used in the purification step to redissolve the polymer. The diluent and alcohol can be separated, for example, by fractional distillation, and reused in the process.

As mentioned before, it is within the scope of the invention to utilize an antioxidant. The antioxidant can be added to the reaction mixture prior to precipitation of the polymer, to the solution of redissolved polymer or to the diluent in which the polymer is to be subsequently dissolved.

The rubbery polymers produced in accordance with this invention have utility in applications where synthetic and natural rubbers are used. The polymers can be compounded by any of the known methods as have been used in the past for compounding rubbers. Compounding ingredients, such as fillers, dyes, pigments, curing or crosslinking agents, softeners, reinforcing agents, and the like, can be used in the compounding operation. In manufacturing finished articles, the rubbery polymers can be molded or extruded. They can be advantageously employed in the manufacture of items such as automobile tires, gaskets, containers, pipe, and the like.

A more comprehensive understanding of the invention can be obtained by referring to the following illustrative examples which are not intended, however, to be unduly limitative of the invention.

EXAMPLE I

Runs were conducted in which 1,3-butadiene and isoprene were homopolymerized and 1,3-butadiene and styrene were copolymerized in accordance with the present invention. Control runs were also carried out in which an organosodium compound was used alone as the catalyst. The following recipes were employed:

| | A | B | C |
|---|---|---|---|
| n-Hexane, parts by weight | 800 | 800 | 800 |
| 1,3-butadiene, parts by weight | 100 | 75 | |
| Styrene, parts by weight | | 25 | |
| Isoprene, parts by weight | | | 100 |
| Lithium n-butoxide, (LiO-n-Bu), mmoles [1] | Variable | Variable | Variable |
| Amylsodium (AmNa), mmoles | Variable | Variable | Variable |
| Temperature, °F | 122 | 122 | 122 |
| Time, hours | Variable | Variable | Variable |

[1] Millimoles per 100 parts of monomers.

The lithium n-butoxide was prepared by mixing equivalent amounts of 0.2 N solutions of n-butyl alcohol and n-butyllithium in cyclohexane. Aliquots of this reaction mixture were employed in the several runs in amounts to provide the desired quantity of lithium n-butoxide.

When carrying out the polymerizations, the diluent was charged after which the reactor was then purged with nitrogen. The conjugated diene was then introduced followed by the styrene, if used. Lithium n-butoxide was then added and finally the amylsodium. In addition to being used in the catalyst system, amylsodium also served as a scavenger. Based on prior experience, the scavenger level was estimated. The results obtained in the runs are shown below in Table I.

The procedure described in Example I was used in these runs. It is seen that quantitative conversions were obtained in the runs.

EXAMPLE III

Runs were conducted for the polymerization of 1,3-butadiene and the copolymerization of 1,3-butadiene with styrene using a catalyst formed from amylsodium and lithium tert-butoxide. A control run was also carried out in which it was attempted to polymerize these monomers with lithium tert-butoxide alone.

TABLE I

| Run No. | Recipe | AmNa, mhm. | Assumed Scavenger AmNa, mhm.[1] | Effective AmNa Level, mhm. | LiO-n-Bu, mhm. | Effective AmNa/LiO-n-Bu Mole Ratio | Time, hrs. | Conv., percent | Polystyrene, wt. percent[2] | Inh.[3] visc. | Gel, percent | Microstructure, Percent[4] | | | |
|---|---|---|---|---|---|---|---|---|---|---|---|---|---|---|---|
| | | | | | | | | | | | | Cis | Trans | Vinyl | 3,4-Addn. |
| 1 | A | 3 | 1.5 | 1.5 | | | 16 | 10 | | 0.86 | 5 | 34.5 | 15.0 | 50.5 | |
| 2 | A | 3 | 1.5 | 1.5 | 4 | 0.375/1 | 16 | 75 | | 2.18 | 0 | 24.8 | 25.7 | 49.5 | |
| 3 | C | 3 | 1.5 | 1.5 | | | 16 | 25 | | 0.37 | 0 | [5]48.5 | | | 51.5 |
| 4 | C | 3 | 1.5 | 1.5 | 4 | 0.375/1 | 16 | 80 | | 1.74 | 0 | [5]50.8 | | | 49.2 |
| 5 | B | 2 | 1 | 1 | 4 | 0.25/1 | 22 | 100 | 0 | 1.93 | 0 | | | | |
| 6 | A | 2 | 1 | 1 | 4 | 0.25/1 | 22 | 100 | | | | 23.4 | 25.7 | 50.9 | |
| 7 | A | 2 | 1 | 1 | 2 | 0.5/1 | 20 | 86 | | | | 23.3 | 20.6 | 56.1 | |
| 8 | B | 2 | 1 | 1 | 2 | 0.5/1 | 16 | 100 | | | | | | | |
| 9 | B | 2.4 | 1 | 1.4 | 2.4 | 0.58/1 | 16 | 100 | | 1.78 | 0 | | | | |
| 10 | B | 2.8 | 1 | 1.8 | 2.8 | 0.64/1 | 16 | 100 | | 1.35 | 0 | | | | |
| 11 | B | 2 | 1 | 1 | 1 | 1/1 | 20 | 81.5 | | 2.15 | 0 | | | | |
| 12 | A | 2 | 1 | 1 | 1 | 1/1 | 20 | 100 | | | | 23.5 | 19.0 | 57.5 | |
| 13 | A | 2 | 1 | 1 | 0.4 | 2.5/1 | 20 | 100 | | | | 20.8 | 19.3 | 59.9 | |

[1] Varies with size of charge.
[2] Determined by oxidative degradation procedure. Approximately 0.5 gram of the polymer was cut into small pieces, weighed to within one milligram, and charged to a 125 ml. flask. Forty to 50 grams of p-dichlorobenzene was then charged to the flask and the contents were heated to 130° C. and maintained at this temperature until the polymer had dissolved. The mixture was cooled to 80° to 90° C., 8.4 ml. of a 71.3 percent by weight aqueous solution of tert-butyl hydroperoxide was added followed by 1 ml. of 0.003 molar osmium tetroxide in toluene. The mixture was heated to between 50° and 60° C., 20 ml. of toluene was added, and the solution was poured slowly into 250 ml. of ethanol containing a few drops of concentrated sulfuric acid. This treatment causes any polystyrene present to coagulate, after which it can be recovered, dried, and weighed.
[3] One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.
[4] Determined by infrared analysis. In the case of copolymers, the results are based on the butadiene portion of the polymer.
[5] 1,4 product, mixture of cis- and trans-.

The data in Table I show that in the first four runs low conversions were obtained when amylsodium was used alone. Addition of lithium n-butoxide gave much higher conversions in parallel runs. The data also show that the presence of the alcoholate produces random copolymers rather than block copolymers. When employing the initiator systems of this invention, the mole ratio of amylsodium/lithium n-butoxide can be varied over a considerable range to give high monomer conversion.

An attempt was made to copolymerize butadiene with styrene using a catalyst formed from amylsodium and sodium n-butoxide. The mole ratio of amylsodium to sodium n-butoxide was 1.5 to 1. No conversion was obtained after 72 hours at 122° F.

EXAMPLE II

Runs were made for the polymerization of 1,3-butadiene and the random copolymerization of 1,3-butadiene with styrene using a catalyst formed by mixing amylsodium and lithium tert-butoxide. The recipes used were as follows:

| | A | B |
|---|---|---|
| 1,3-butadiene, parts by weight | 100 | 75 |
| Styrene, parts by weight | | 25 |
| Cyclohexane, parts by weight | 800 | 800 |
| Amylsodium, mmoles[1] | 2.0 | 2.0 |
| Assumed scavenger, mmole | 1.0 | 1.0 |
| Lithium tert-butoxide, mmoles | 10.0 | 10.0 |
| Effective AmNa/LiO-t-Bu mole ratio | 0.1/1 | 0.1/1 |
| Temperature, °F | 122 | 122 |
| Time, hours | 17 | 17 |
| Conversion, percent | (²) | (²) |

[1] Millimoles per 100 parts of monomers.
[2] Quantitative.

| | A | B | C | D |
|---|---|---|---|---|
| 1,3-Butadiene, parts by weight | 100 | 75 | 100 | 75 |
| Styrene, parts by weight | 0 | 25 | 0 | 25 |
| n-Hexane, parts by weight | 800 | 800 | 800 | 800 |
| n-Amylsodium (AmNa), mmoles | 3.0 | 3.0 | | |
| Lithium tert-butoxide (LiO-t-Bu), mmoles | var. | var. | 12.0 | 12.0 |
| Assumed scavenger (AmNa), mmoles | 1.5 | 1.5 | | |
| Effective AmNa level, mmoles | 1.5 | 1.5 | | |
| Temperature, °F | 122 | 122 | 122 | 122 |
| Time, hours | 16 | 16 | 16 | 16 |

The results obtained in the polymerization runs are shown in Table II.

TABLE II

| Run No. | Recipe | LiO-t-Bu, Mmoles | Effective AmNa/LiO-t-Bu Mole Ratio | Conv., Percent |
|---|---|---|---|---|
| 1 | A | 0 | | 5 |
| 2 | A | 0.3 | 5/1 | 23 |
| 3 | A | 3.0 | 0.5/1 | 42 |
| 4 | A | 6.0 | 0.25/1 | 89 |
| 5 | A | 12.0 | 0.125/1 | 42 |
| 6 | B | 0 | | 5 |
| 7 | B | 0.3 | 5/1 | 5 |
| 8 | B | 3.0 | 0.5/1 | 10 |
| 9 | B | 6.0 | 0.25/1 | 79 |
| 10 | B | 12.0 | 0.125/1 | 99 |
| 11 | C | 12.0 | | 0 |
| 12 | D | 12.0 | | 0 |

The data in Table II show that low conversions were obtained when an organosodium compound was used alone as a catalyst. Also, no conversion was obtained when an organic compound of lithium was used alone. However, when a combination of these two materials was employed in forming the catalyst, high conversions were obtained.

EXAMPLE IV

A series of runs is conducted in which 1,3-butadiene is polymerized in the presence of different catalyst systems of this invention. The catalysts are formed according to the procedure described in Example I, and variable quantities of the catalyst components are employed. The following organo-sodium compounds and organic compounds of lithium are used in forming each of the catalyst systems:

(1) isopropylsodium and lithium salt of 2,2′-methylene-bis(4-methyl-6-tert-butylphenol),
(2) sec-butylsodium and lithium salt of tert-butyl alcohol,
(3) phenylsodium and the lithium salt of isopropyl alcohol,
(4) cyclohexylsodium and the lithium salt of allyl alcohol,
(5) 1,4-disodiobutadiene and the lithium salt of 2-pentanethiol,
(6) naphthylsodium and the lithium salt of stearic acid,
(7) 1,3,5-trisodiopentane and the lithium salt of oleic acid,
(8) tert-octylsodium and the lithium salt of n-hexylcarbonic acid,
(9) p-tolylsodium and the lithium salt of dimethylamine, and
(10) 4-phenylbutylsodium and the lithium salt of diphenylamine.

A rubbery polymer of butadiene is obtained in each of the runs.

The above-described runs are repeated using a 50/50 weight mixture of isoprene and styrene. The products obtained in these runs are completely random copolymers of isoprene and styrene.

As will be evident to those skilled in the art, many variations and modifications can be practiced upon consideration of the foregoing disclosure. Such variations and modifications are clearly believed to be within the spirit and scope of the invention.

I claim:

1. A process for preparing conjugated diene polymers which comprises contacting in a polymerization zone a monomeric material selected from the group consisting of (1) at least one conjugated diene containing from 4 to 12 carbon atoms per molecule and (2) a mixture of a conjugated diene containing from 4 to 12 carbon atoms per molecule and a vinyl-substituted aromatic hydrocarbon in which said vinyl group is attached to a nuclear carbon atom with a catalyst which forms on mixing materials consisting essentially of (a) an organosodium compound having the formula $R(Na)_x$, wherein R is a hydrocarbon radical selected from the group consisting of aliphatic, cycloaliphatic and aromatic radicals containing from 1 to 20 carbon atoms and $x$ is an integer from 1 to 4, inclusive, and (b) an organic lithium compound selected from the group consisting of compounds having the following formulas:

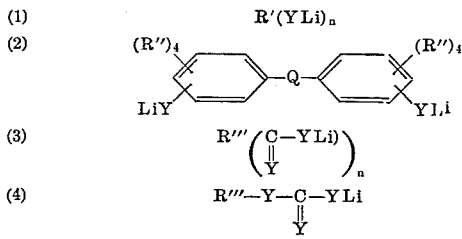

wherein R′ is selected from the group consisting of aliphatic, cycloaliphatic and aromatic radicals containing from 1 to 20 carbon atoms, R″ is selected from the group consisting of hydrogen, and aliphatic, cycloaliphatic and aromatic radicals containing from 1 to 6 carbon atoms, Q is selected from the group consisting of

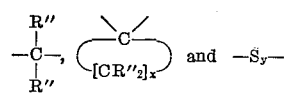

radicals where R″ is as defined before, $x$ is an integer from 4 to 5, inclusive, and $y$ is an integer from 1 to 3, inclusive, R‴ is selected from the group consisting of aliphatic, cycloaliphatic and aromatic radicals containing from 4 to 20 carbon atoms, Y is oxygen and $n$ is an integer from 1 to 3, inclusive, the amount of said organosodium compound is in the range of 0.25 to 100 milliequivalents of organosodium compound per 100 parts by weight of monomeric material, and the relative quantities of said organosodium compound and said organic compound is in the range of 0.01 to 20 equivalents of organosodium compound (based on sodium atoms) per equivalent of organic lithium compound, said contacting occurring at a temperature in the range of −80 to 150° C. and in the presence of a hydrocarbon diluent; and recovering a conjugated diene polymer.

2. A process according to claim 1 in which said monomeric material is 1,3-butadiene.

3. A process according to claim 1 in which said monomeric material is isoprene.

4. A process according to claim 1 in which said monomeric material is a mixture of 1,3-butadiene and styrene.

5. A process according to claim 1 in which said monomeric material is a mixture of isoprene and styrene.

6. A process according to claim 1 in which said monomeric material is a mixture of 1,3-butadiene and 3-methylstyrene.

7. A process according to claim 1 in which the amount of said organosodium compound is in the range of 0.6 to 15 milliequivalents of organosodium compound per 100 parts by weight of monomeric material, and the relative quantities of said organosodium compound and said organic compound is in the range of 0.01 to 20 equivalents of organosodium compound (based on sodium atoms) per equivalent of organic lithium compound and said contacting occurs at a temperature in the range of −20 to 80° C.

8. A process according to claim 1 in which said catalyst is one which forms on mixing materials consisting essentially of n-amylsodium and lithium n-butoxide.

9. A process according to claim 1 in which said catalyst is one which forms on mixing materials consisting essentially of n-amylsodium and lithium tert-butoxide.

10. A process according to claim 1 in which said catalyst is one which forms on mixing materials consisting essentially of naphthylsodium and lithium salt of stearic acid.

11. A process according to claim 1 in which said catalyst is one which forms on mixing materials consisting essentially of phenylsodium and lithium isopropoxide.

12. A catalyst for the polymerization of conjugated dienes consisting essentially of a composition which forms on mixing materials consisting essentially of (a) an organosodium compound having the formula $R(Na)_x$, wherein R is a hydrocarbon radical selected from the group consisting of aliphatic, cycloaliphatic and aromatic radicals containing from 1 to 20 carbon atoms and $x$ is an integer from 1 to 4, inclusive, and (b) an organic lithium compound selected from the group consisting of compounds having the following formulas:

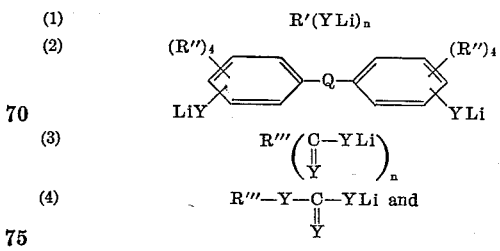

wherein R' is selected from the group consisting of aliphatic, cycloaliphatic and aromatic radicals containing from 1 to 20 carbon atoms, R'' is selected from the group consisting of hydrogen, and aliphatic, cycloaliphatic and aromatic radicals containing from 1 to 6 carbon atoms, Q is selected from the group consisting of

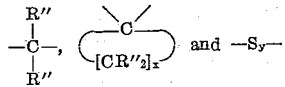

radicals where R' is as defined before, $x$ is an integer from 4 to 5, inclusive, and $y$ is an integer from 1 to 3, inclusive, R''' is selected from the group consisting of aliphatic, cycloaliphatic and aromatic radicals containing from 4 to 20 carbon atoms, Y is oxygen, and $n$ is an integer from 1 to 3, inclusive, the amount of said organosodium compound being in the range of 0.01 to 20 equivalents (based on sodium atoms) per equivalent of said organic lithium compound.

13. A catalyst for the polymerization of conjugated dienes consisting essentially of a composition which forms on mixing materials consisting essentially of n-amylsodium and lithium tert-butoxide.

14. A catalyst for the polymerization of conjugated dienes consisting essentially of a composition which forms on mixing materials consisting essentially of n-amylsodium and lithium n-butoxide.

References Cited
UNITED STATES PATENTS

| | | | |
|---|---|---|---|
| 2,849,432 | 8/1958 | Kibler et al. | 260—94.2 |
| 2,856,391 | 10/1958 | Diem | 260—94.2 |
| 3,177,190 | 4/1965 | Hsieh | 260—94.2 |
| 3,208,988 | 9/1965 | Forman et al. | 260—94.2 |

OTHER REFERENCES

Chemical Abstract, vol. 52, Jan. and Feb. 1958, pp. 3386.

JOSEPH L. SCHOFER, *Primary Examiner.*

JAMES A. SEIDLECK, *Examiner.*